9/2/80 XR 4,220,884

SR

United States Patent [19]

Sternbergh

[11] 4,220,884

[45] Sep. 2, 1980

[54] CARBON BRUSH FOR MOTORS AND METHOD OF MAKING THE SAME

[75] Inventor: James H. Sternbergh, Rochester, N.Y.

[73] Assignee: TRW, Inc., Cleveland, Ohio

[21] Appl. No.: 901,472

[22] Filed: May 1, 1978

[51] Int. Cl.$^2$ ........................ H02K 13/00; H01B 1/04; B05D 1/12; B32B 9/00

[52] U.S. Cl. .................................... 310/251; 252/503; 427/114; 427/123; 427/294; 427/433; 428/408

[58] Field of Search ........................ 252/503; 428/408; 310/87, 251, 248, 252, 253; 427/113, 114, 123, 294, 433

[56] References Cited

U.S. PATENT DOCUMENTS

| | | | |
|---|---|---|---|
| 2,174,887 | 10/1939 | Kiefer | 310/251 |
| 2,530,984 | 11/1950 | Moberly | 427/294 |
| 2,820,728 | 1/1958 | Burns, Jr. | 427/294 |
| 3,049,448 | 8/1962 | Millet | 427/294 |
| 3,165,480 | 1/1965 | Churchill, Jr. | 310/253 |
| 3,436,253 | 4/1969 | Kelsey et al. | 428/408 |
| 3,924,025 | 12/1975 | Niemeyer et al. | 310/87 |
| 3,949,804 | 4/1976 | Kaneko et al. | 427/294 |
| 3,956,568 | 5/1976 | Kanemaru et al. | 428/408 |

FOREIGN PATENT DOCUMENTS

| | | | |
|---|---|---|---|
| 2135537 | 2/1973 | Fed. Rep. of Germany | 310/253 |

OTHER PUBLICATIONS

Kalb et al. "Carbon Brushes for Electrical Equipment" Union Carbide Monograph, Jul. 1966, pp. 16–20.

Shobert, "Carbon Brushes" Chemical Publishing Co., 1965, pp. 174–177.

*Primary Examiner*—William R. Dixon, Jr.

*Attorney, Agent, or Firm*—Jacob Trachtman

[57] ABSTRACT

A brush for an electric motor including a body of porous carbon impregnated with tin or alloys of tin with either lead, zinc, or silver and combinations thereof. The metal impregnated brush can be used in an electric motor which is operated while immersed in gasoline without substantial loss of the electrical and mechanical properties of the brush.

23 Claims, 8 Drawing Figures

FIG. 2
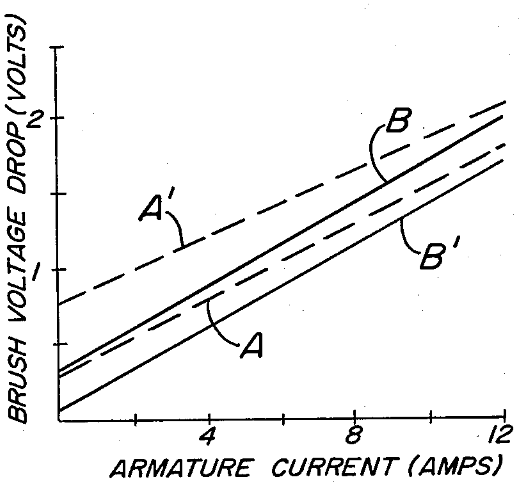
FIG. 3
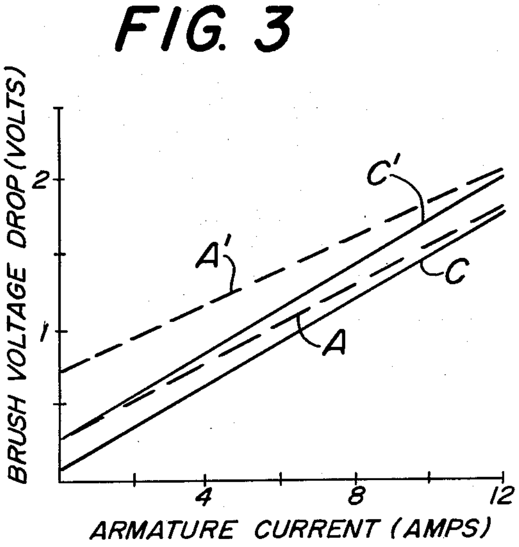
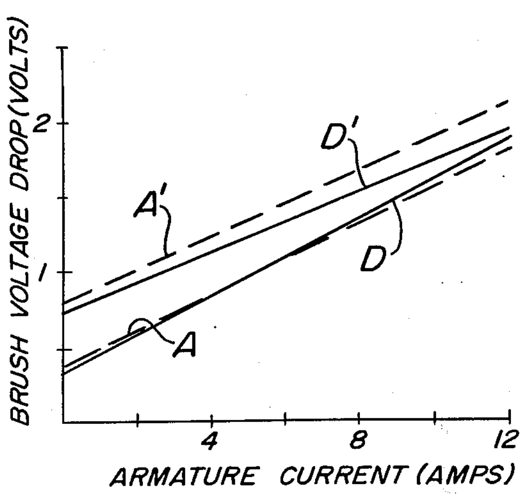
FIG. 4
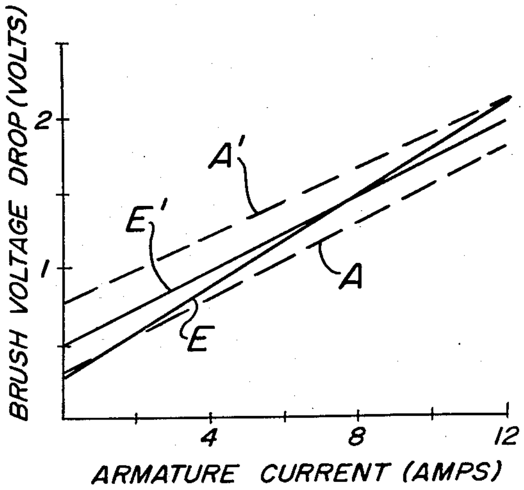
FIG. 5

CARBON BRUSH FOR MOTORS AND METHOD OF MAKING THE SAME

The present invention relates to a brush for an electric motor and particularly to a brush which can be used in an electric motor which is operated while immersed in gasoline, and the method for making the same.

The brushes of an electric motor have three distinct functions to perform. First, they must carry the load current to and from the rotating element or armature of the motor. Second, they must resist destructive action from the voltage induced in imperfectly compensated armature coils undergoing commutation. Third, they must act as a bearing material so as to maintain a low wearing contact with the commutator at high surface speeds.

The brushes initially used in electric motors were made of metal. Wire gauze tightly rolled and pressed into a cross-sectional shape of suitable form, or bundles of thin copper strips were the most common form of metal brushes. A disadvantage of these brushes was that the resistance between the brushes and the commutator was very low, thereby, providing very little control of the current in the coils undergoing commutation, and resulting in sparking of destructive intensity together with rapid wear of the commutator.

To overcome the problems of the metal brushes, brushes made of carbon were developed. Although a great many different types and shapes of carbon brushes have been developed, four different grades or basic kinds of carbon brushes have evolved, each of which has advantages and disadvantages which make it more or less desirable for specific applications over the other types. One grade of carbon brush is the carbon-graphite grade, which is a blend of carbon and graphite rich materials molded and baked at 2000° F. The brushes of this grade are primarily used in low speed motors carrying relatively light loads. The second grade is the electrographitic brush which is graphite made in an electric graphitizing furnace. The brushes from this grade have excellent commutating ability and are generally hard and durable so that they have a long life. They give good performance at high speeds and at high current densities, so that they are used on many standard voltage motors. The third grade is the graphite brush which is a blend of both natural and artifical graphites baked at some elevated temperature. The graphite grade brushes are soft, so that they usually have a low coefficient of friction. Thus, the graphite grade brushes can be used successfully on high speed motors where operating temperatures are not too high. The fourth grade is the metal-graphite brush which is a combination of a metal and graphite. These brushes can be formed from a blend of finely divided graphite and metal powders which are bonded together either using a polymeric binder or by being sintered together. Another type of metal-graphite brush is made by impregnating the pores of some porous grade of graphite, such as the electrographitic grade, with a molten metal. Metal-graphite grade brushes provide electrical properties of both the metal and the graphite and are capable of carrying very high currents without being abrasive because of the lubrication provided by the graphite. Metal-graphite grade brushes have found extensive application in motors involving slip rings and in low voltage motors.

There has come into use electric motors which must operate while submerged in gasoline. For example, motors for operating the fuel pumps of gasoline operated internal combustion engines. The brushes for such electric motors must not only be capable of withstanding any chemical effects of the gasoline, but also must be capable of providing good electrical contact with the commutator so as to maintain a constant voltage drop across the armature and providing good frictional qualities so that the speed of the motor is not appreciably reduced when submerged and operated in the gasoline. When used for metering and control purposes, motor speed stability is most critical since undersirable variations will adversely effect engine control and the generation of pollution products.

Therefore it is an object of the present invention to provide a novel brush for and electric motor, and the method for making the same.

It is another object of the present invention to provide a novel metal-graphite brush for an electric motor.

It is still another object of the present invention to provide a metal-graphite brush for an electric motor which can operate while submerged in gasoline without adversely affecting the operating characteristics of the motor.

It is a further object of the present invention to provide a metal-graphite brush for an electric motor and method of making the same in which the graphite body is impregnated with tin or alloys of tin and either lead, zinc, or silver and combinations thereof.

Other objects will appear hereinafter.

The invention accordingly comprises an article and method of manufacture possessing the features, properties, and the relation of elements which will be exemplified in the articles hereinafter described, and the scope of the invention will be indicated in the claims.

For a fuller understanding of the nature and objects of the invention, reference should be had to the following detailed description taken in connection with the accompanying drawing in which:

FIGS. 2–8 are graphs showing certain operating characteristics of the brushes of the present invention.

The brushes of the present invention each comprise a body of porous carbon which is impregnated with tin, or alloys of tin with either lead, zinc, or silver or combinations of these meatls. Suitable alloys includes a 30:70 tin-lead alloy; a 95:5 tin-silver alloy, and an alloy of 97.5% lead, 1.5% silver and 1% tin. The carbon body may be any of the well known porous carbon brushes, such as Morganite EG260 carbon brush and a Stackpole 417 carbon brush.

Figure 1:
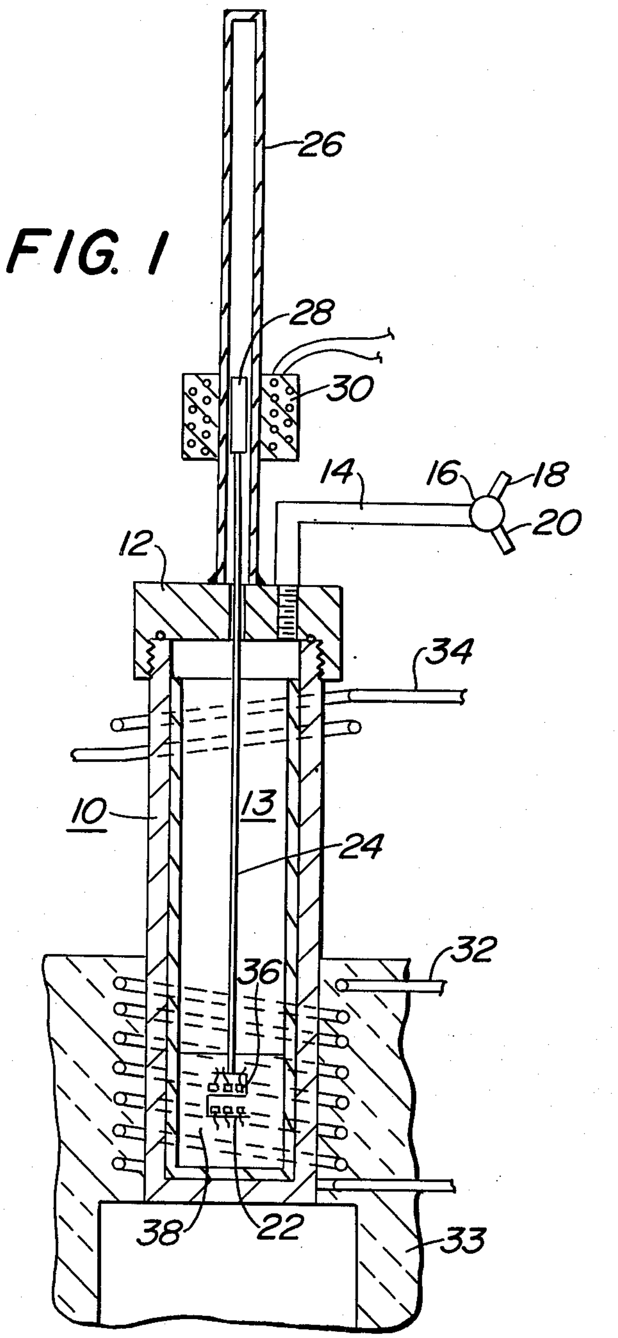
FIG. 1 is a schematic view of an apparatus suitable for making the brushes of the present invention.

The carbon brush may be impregnated with the metal in an apparatus such as shown in FIG. 1 of the drawing. The apparatus includes a container 10 having a cover 12 for providing a hermetically sealed chamber 13. An inlet-outlet pipe 14 extends through the cover 12 and connects with valve 16. The inlet-outlet pipe 14 is selectively connected by the valve 16 to a vacuum port 18 which is joined to a vacuum pump (not shown). The inlet-outlet pipe 14 is also selectively connected by valve 16 to an inlet port 20 which is joined to a pressure pump (not shown).

A brush holding fixture 22 is supported within the chamber 13 at the end of a connecting rod 24 which extends vertical upward through the cover 12 into the cavity formed by a stainless steel tube 26 having its bottom welded to the top of the cover 12 and its upper end sealed. A soft iron slug 28 which is positioned within the tube 26 for slideable motion, is joined to the top end of the connecting rod. A solenoid coil 30 is positioned about the stainless steel tube 26 for slideable movement therealong, and when electrically activated provides a magnetic force which attracts and moves the iron slug 28 within the steel tube 26, for positioning the brush holding fixture 22 within the chamber 13.

An electrical heating coil 32 with its windings about the bottom portion of the container 10 is provided within an insulating jacket 33 for heating the content at the lower portion of its chamber 13 when energized. A cooling coil 34 in the form of a tube through which cool water is circulated is positioned about the top portion of the container 10 for cooling and providing a cool zone at the top portion of the chamber 13.

To form a brush of the present invention, the cover 12 is removed and metal is placed at the bottom of the chamber of the container 10 and the container 10 is heated by energization of the coil 32 to provide a pool of molten metal 38. The porous carbon body 36 is placed on the holding fixture 22, the solenoid coil 30 is activated and the cover 12 is then placed on the container and sealed in place with the fixture 22 positioned within the chamber 13 of the container 10 above the metal 38. The container is then connected to the vacuum pump through the outlet port 18, valve 16 and pipe 14, and the chamber 13 is evacuated to 1-100 microns of mercury (Hg). This results in removal of gases trapped within interconnected pores of the carbon body 36. To assist in the removal of trapped gases, the body 36 may be heated by being lowered into (see FIG. 1) and then removed from the molten metal 36. For the next step, the carbon body is lowered into the molten metal, and the container 10 is disconnected from the vacuum pump and connected to the pressure pump through the inlet port 20, valve 16 and pipe 14. A pressure of about 300 pounds per square inch is applied to the molten metal forcing the metal into the pores of the carbon body. The impregnated carbon body is then raised out of the molten metal to the cooling zone at the top of the chamber 13, so that the metal in the carbon body solidifies. The container 10 is then disconnected from the pressure pump and opened to remove the metal impregnated carbon body.

The following examples are given to illustrate certain preferred details of the invention, it being understood that the details of the examples are not to be taken as in any way limiting the invention thereto.

EXAMPLE I

Plain Stackpole #417 electrographitic brushes which were not subjected to the method of the invention were mounted in a drive motor made by the Globe Motor division of TRW, Inc. The drive motor was mechanically coupled to a 760 watt (1 HP) hysteresis motor so that, regardless of test conditions, the speed of the Globe Motor would remain constant, i.e. about 4700 rpm. The Globe Motor was run as if the hysteresis motor was a load (motor case), and as if the hysteresis motor had the Globe Motor as a load (generator case). The armature current of the Globe Motor was controlled as closely as possible at various chosen values, with the values being the same for both the motor case and generator case. The external voltage across the armature was then measured for both modes of operation, i.e. as motor and as generator, at each chosen armature current. These measurements were made with the brushes running dry (in air) and running wet (in no-lead gasoline). The external voltage for the motor case is the sum of the brush voltage drops for the pair of brushes and the armature voltage at the commutator. Likewise, the external voltage for the generator case is the difference between the armature generated voltage and the sum of the brush voltage drops for the brush pair. The differences between the externally measured voltages for motor and generator modes of operation is, therefore, four times the voltage drops across a single brush when the current is the same for the two modes of operation and the armature resistance is negligable. The voltage drop vs. armature current characteristics for the plain Stackpole #417 brush is shown in each of the FIGS. 2–5, with the dashed lines A for the brushes running dry and the dashed lines A' for the brushes running wet.

EXAMPLE II

Brushes were made using an apparatus similar to that shown in FIG. 1 by placing the metal tin at the bottom of the container and plain Stackpole #417 electrographitic brushes in the holding fixture. The container was sealed and heated until the metal melted. The container was then evacuated and the brushes immersed in the molten metal. Pressure was then applied to the molten metal in the container. The impregnated brushes were removed from the molten metal and the metal in the brushes was allowed to solidify. The resultant brushes had a tin content of approximately 10% by volume and were tested in the same manner as described in EXAMPLE I. FIG. 2 is a graph showing the averaged readings obtained for the brush voltage drop vs. armature current characteristics for the tin impregnated brushes of the present invention. The solid line B provides the characteristics for the brushes running dry, while the solid line B' is for the brushes running wet.

EXAMPLE III

Brushes were made in the same manner as described in EXAMPLE II except that the metal was a 30:70 tin-lead alloy. The impregnated brushes had an alloy content of approximately 13% by volume and were tested in the same manner as described in EXAMPLE I. The brush voltage drop vs. armature current characteristics for these brushes running dry and wet, respectively, are shown by the solid lines C and C' in FIG. 3.

EXAMPLE IV

Brushes were made in the same manner as described in EXAMPLE II except that the metal was a 95:5 tin-silver alloy. The impregnated brushes had an alloy content of approximately 10% by volume and were tested in the same manner as described in EXAMPLE I. The brush voltage drop vs. armature current characteristics for these brushes running dry and wet, respectively, are shown by the solid lines D and D' in FIG. 4.

EXAMPLE V

Brushes were made in the same manner as described in EXAMPLE II except that the metal was an alloy of 97.5% lead, 1.5% silver and 1% tin. The impregnated brushes had an alloy content of approximately 12.5% by volume and were tested in the same manner as described in EXAMPLE I. The brush voltage drop vs. armature current characteristics for these brushes running dry and wet, respectively, are shown by lines E and E' in FIG. 5.

EXAMPLE VI

Figure 6:
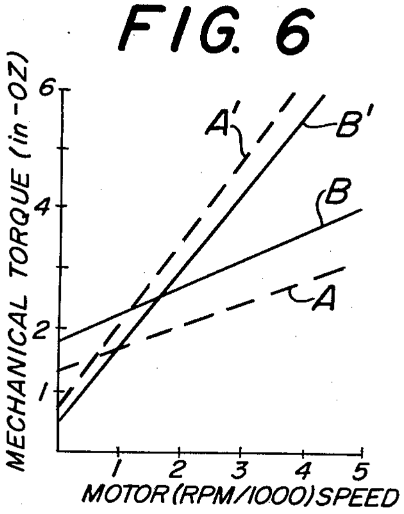
Figure 7:
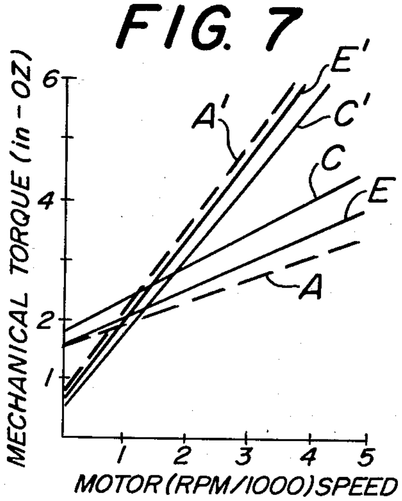
Figure 8:
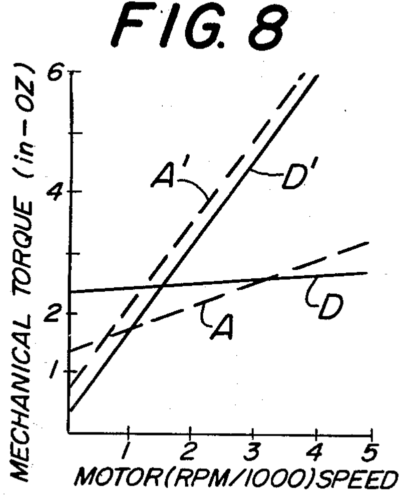

Plain Stackpole #417 electrographitic brushes which were not subject to the method of the invention, were mounted in a test motor which had its magnets demagnetized so that no appreciable electrical drag was present during armature rotation. The test motor had its housing fixed to a base and had its armature mechanically coupled to the armature of a drive motor. The drive motor had its housing rotatably mounted on a turret above the test motor and the rotational position of the housing was coupled by a flexible steel cable to a balance beam for measuring torque. With the drive motor operated at different steady state speeds, torque measurements were taken in inch-ounces for the test motor running dry (in air) and then for the test motor running wet (in no-lead gasoline). The mechanical torque vs. motor speed characteristics obtained for the plain Stackpole #417 brush is shown in each graph of the FIGS. 6–8, by the dashed lines A for the brushes running dry and the dashed lines A′ for the brushes running wet. The intersections of the lines A and A′ with the vertical graph axis respectively indicate values of static friction of 1.3 in-ounce for the dry condition and 0.8 in-ounce for the wet condition.

EXAMPLE VII

Brushes impregnated with tin made as described in EXAMPLE II were tested in the same manner described in EXAMPLE VI. The mechanical torque vs. motor speed characteristics for these brushes running dry and wet, respectively, are shown by the solid lines B and B′ in the graph of FIG. 6. The intersections of the lines B and B′ with the vertical graph axis, respectively indicate values of static friction of 1.8 in-ounce for the dry condition and 0.5 in-ounce for the wet condition.

EXAMPLE VIII

Brushes impregnated with 30:70 tin-lead alloy made as described in EXAMPLE III were tested in the same manner described in EXAMPLE VI. The mechanical torque vs. motor speed characteristics for these brushes running dry and wet, respectively, are shown by the solid lines C and C′ in the graph of FIG. 7. The intersections of the lines C and C′ with the vertical graph axis, respectively, indicate values of static friction of 1.8 in-ounce for the dry condition and 0.6 in-ounce for the wet condition.

EXAMPLE IX

Brushes impregnated with 95:5 tin-silver alloy made as described in EXAMPLE IV were tested in the same manner described in EXAMPLE VI. The mechanical torque vs. motor speed characteristics for these brushes running dry and wet, respectively, are shown by the solid lines D and D′ in the graph of FIG. 8. The intersections of the lines D and D′ with the vertical graph axis, respectively indicate values of static friction of 2.4 in-ounce for the dry condition and 0.3 in-ounce for the wet condition.

EXAMPLE X

Brushes impregnated with an alloy of 97.5% lead, 1.5% silver and 1% tin made as described in EXAMPLE III were tested in the same manner described in EXAMPLE VI. The mechanical torque vs. motor speed characteristics for these brushes running dry and wet, respectively, are shown by the solid lines E and E′ in the graph of FIG. 7. The intersections of the lines E and E′ with the vertical graph axis, respectively indicate values of static friction of 1.3 in-ounce for the dry condition and 0.7 in-ounce for the wet condition.

It will thus be seen that the object set forth above, among those made apparent from the preceding description, are efficiently attained and, since certain changes may be made in the above articles without departing from the scope of the invention, it is intended that all matter contained in the above description or shown in the accompanying drawing shall be interpreted as illustrative and not in a limiting sense.

What is claimed is:

1. A carbon contact brush for a dynamo-electric device consisting essentially of a body of porous carbon and a metal filling at least a portion of the pores, said metal being selected from the group consisting of tin and alloys of tin with any one of the metals lead, zinc, and silver, and combinations thereof.

2. A brush in accordance with claim 1 wherein the metal is tin, and the metal content is approximately 10% by volume.

3. A brush in accordance with claim 1 wherein the metal is an alloy containing tin, and the alloy content is about between 10 to 13% by volume.

4. A brush in accordance with claim 1 wherein the alloy contains 30% tin and 70% lead.

5. A brush in accordance with claim 1 wherein the alloy contains 95% tin and 5% silver.

6. A brush in accordance with claim 1 wherein the alloy contains 97.5% lead, 1.5% silver and 1% tin.

7. A brush in accordance with claim 1 wherein the carbon body is of electrographitic grade.

8. A brush in accordance with claim 1 wherein the metal is impregnated in the pores of the carbon body under pressure.

9. In a dynamo-electric device which is capable of operating while submerged in gasoline, a commutator brush consisting essentially of a body of porous carbon impregnated with a metal selected from the group consisting of tin and alloys of tin with any one of the metals lead, zinc, and silver, and combinations thereof.

10. A device in accordance with claim 9 wherein the carbon body of the brush is impregnated with tin, and the metal content is approximately 10% by volume.

11. A device in accordance with claim 9 wherein the carbon body of the brush is impregnated with an alloy of tin, and the alloy content is about between 10% and 13% by volume.

12. A device in accordance with claim 9 wherein the alloy contains 30% tin and 70% lead.

13. A device in accordance with claim 9 wherein the alloy contains 95% tin and 5% silver.

14. A device in accordance with claim 9 wherein the alloy contains 97.5% lead, 1.5% silver and 1% tin.

15. A device in accordance with claim 9 in which the carbon body is of an electrographitic grade.

16. A method of making a carbon contact brush for a dynamo-electric device comprising the steps of melting a metal of the group consisting of tin, and alloys of tin with lead, zinc and silver, and combinations thereof, immersing a porous carbon body in the metal to impregnate it with the molten metal, removing the body from the molten metal and cooling the body to solidify the metal therewithin.

17. A method in accordance with claim 16 in which the metal and carbon body are received in a sealed chamber and the chamber is evacuated to remove gases from the pores of the carbon body before the body is immersed.

18. A method in accordance with claim 17 in which the porous body is heated by temporarily immersing the body in the molten metal with the chamber evacuated to assist removal of gases from the pores of the body.

19. A method in accordance with claim 16, 17 or 18 in which the metal and carbon body are received in a sealed chamber and subjected to pressure during the immersion of said body in said molten metal and during the cooling of the body to assist in the impregnation of the body with the metal.

20. A carbon contact brush for a dynamo-electric device made by melting a metal of the group consisting of tin, and alloys of tin with lead, zinc and silver, and combinations thereof, immersing a porous carbon body in the metal to impregnate it with the molten metal, removing the body from the molten metal and cooling the body to solidify the metal therewithin.

21. A brush made in accordance with claim 20 in which the metal and carbon body are received in a sealed chamber and the chamber is evacuated to remove gases from the pores of the carbon body before the body is immersed.

22. A brush made in accordance with claim 21 in which the porous body is heated by temporarily immersing the body in the molten metal with the chamber evacuated to assist removal of gases from the pores of the body.

23. A brush made in accordance with claim 20, 21 or 22 in which the metal and carbon body are received in a sealed chamber and subjected to pressure during the immersion of said body in said molten metal and during the cooling of the body to assist in the impregnation of the body with the metal.

* * * * *